United States Patent [19]
Giuliani et al.

[11] Patent Number: 5,473,846
[45] Date of Patent: Dec. 12, 1995

[54] LOADING DOCK SHELTER WITH A ROTATABLE SEAL

[75] Inventors: Jon Giuliani, Whitefish, Wis.; Bill Triervieler, Dubuque, Iowa; David Hoffmann, Dubuque, Iowa; Tom Boffeli, Dubuque, Iowa; Tom Medley, Dubuque, Iowa; Bob Frommelt, Perosta, Iowa; Ken Lenz, Cuba City, Wis.; Tom Duccini, Dubuque, Iowa

[73] Assignee: Rite-Hite Corporation, Milwaukee, Wis.

[21] Appl. No.: 996,669

[22] Filed: Dec. 24, 1992

[51] Int. Cl.$^6$ ............................... E04B 1/34; E04F 10/04
[52] U.S. Cl. ...................... 52/173.2; 52/2.12; 52/204.66; 52/2.13; 49/312
[58] Field of Search ................. 52/173.2, 2.12, 52/2.13, 213, 204.66; 49/498.1, 309, 310–314

[56] References Cited

U.S. PATENT DOCUMENTS

| | | |
|---|---|---|
| Re. 28,391 | 4/1975 | Frommelt et al. . |
| 2,565,393 | 8/1951 | Oswald ................................. 49/312 |
| 2,892,463 | 6/1959 | Frommelt et al. . |
| 3,095,886 | 7/1963 | Frommelt et al. . |
| 3,181,205 | 5/1965 | Frommelt et al. . |
| 3,230,675 | 1/1966 | Frommelt et al. . |
| 3,352,314 | 11/1967 | Frommelt et al. . |
| 3,403,489 | 10/1968 | Frommelt et al. . |
| 3,538,655 | 11/1970 | Frommelt et al. . |
| 3,557,508 | 1/1971 | Frommelt et al. . |
| 3,638,667 | 2/1972 | Frommelt et al. . |
| 3,653,155 | 4/1972 | de Brunyn, Jr. et al. ............... 49/313 |
| 3,653,173 | 4/1972 | Frommelt et al. . |
| 3,699,733 | 10/1972 | Frommelt et al. . |
| 3,792,559 | 2/1974 | Frommelt et al. . |
| 3,826,049 | 7/1974 | Frommelt et al. . |
| 3,875,954 | 4/1975 | Frommelt et al. . |
| 3,915,183 | 10/1975 | Frommelt . |
| 3,934,380 | 1/1976 | Frommelt et al. . |
| 3,935,684 | 2/1976 | Frommelt et al. . |
| 3,939,614 | 2/1976 | Frommelt et al. ..................... 52/173.2 |
| 4,262,458 | 4/1981 | O'Neal ................................. 52/173.2 |
| 4,381,631 | 5/1983 | Frommelt . |
| 4,601,142 | 7/1986 | Frommelt . |
| 4,718,207 | 1/1988 | Frommelt ............................. 52/173.2 |
| 4,750,299 | 6/1988 | Frommelt et al. ..................... 52/2.13 |
| 4,799,341 | 1/1989 | Frommelt et al. . |
| 4,805,362 | 2/1989 | Frommelt et al. . |
| 4,821,468 | 4/1989 | Moore .................................. 52/2.13 |
| 4,873,800 | 10/1989 | Frommelt et al. . |
| 5,007,211 | 4/1991 | Ouellet ................................. 52/173.2 |
| 5,055,335 | 10/1991 | Wicks .................................. 49/314 |

FOREIGN PATENT DOCUMENTS

4194 of 1907 United Kingdom .................... 40/312

*Primary Examiner*—Carl D. Friedman
*Assistant Examiner*—Winnie Yip
*Attorney, Agent, or Firm*—Leydig, Voit & Mayer, Ltd.

[57] ABSTRACT

A loading dock shelter having a rotating seal member is provided for forming a relatively air-tight seal between the dock opening and the truck to prevent the movement of air between the inside and outside of the building during the loading and unloading operation. The seal members are rotatably mounted to the frame assembly for rotation between a first (open) position and a second (sealing) position in response to the movement of the truck into and out of the loading dock. In the first position, the seal member is spaced outwardly from the wall and the loading dock so that it does not interfere with the normal operation of the loading dock and so that it projects into the path of the truck for engaging the truck as the truck backs into the loading dock. After the truck initially engages the seal members, the rearward movement of the truck rotates the seals from the open position to the sealing position in which the seal member is compressed against the outer wall of the truck so that it does not block or otherwise interfere with the normal loading/unloading of the truck.

18 Claims, 8 Drawing Sheets

LOADING DOCK SHELTER WITH A ROTATABLE SEAL

FIELD OF THE INVENTION

The present invention relates generally to loading dock shelters and more particularly to a deformable, resilient seal for a loading dock shelter.

BACKGROUND OF THE INVENTION

Trucks are typically backed into or in close proximity to a loading dock or other opening in the building to facilitate loading and unloading of the vehicle. Since the width of the dock opening is typically larger than truck width so that vehicles of different sizes can be readily serviced, a gap is formed between the loading dock walls and the vehicle which exposes the interior of the building to the outside weather and permits air to flow into or out of the building. Attempts to seal the interior of the building from the outside environment have included loading dock shelters which utilize fabric or sheet material to form walls or curtains between the opening and the truck and loading dock seals which utilize resilient, compressible pad members, generally disposed at the lateral and top edges of the opening, to sealably engage the walls or rear edges of the truck.

Unfortunately, many typical loading dock seals and shelters have several disadvantages. Since the dock seals must be disposed so that they overlap or extend into the truck's doorway to ensure that the rear edges of the truck engage the compressible pad members, they have reduced the size of the passageway, limiting access into the truck and generally inhibiting loading and unloading of the truck. The compressible pads also require the truck to exert considerable force on the pad in order to obtain the proper sealing engagement, increasing abrasion and wear on the seal and curtain materials, particularly where the rear corners and edges of the truck rub against the material. Attempts to protect against such abrasion and wear including, for example, reinforcing the materials with several layers have been largely unsatisfactory because, although they increase or prolong the wear resistance of the material, they have the inherent disadvantage of increasing cost. Since many loading docks have non-horizontal, angled or tilted driveway grades, many loading dock shelters must be individually manufactured in order to accommodate such grades and maintain the proper perpendicular orientation between the truck walls and the seals. This increases manufacturing and installation costs. Although it is desirable to seal the truck and opening to prevent the escape of heated or air conditioned air during inclement weather, it is undesirable to do so during mild weather. Unfortunately, the pads and the frame of the shelter, typically disposed along the periphery of the opening, can not be removed or adjusted to unseal the opening.

OBJECTS AND SUMMARY OF THE INVENTION

It is an object of the present invention to provide an improved seal for a loading dock shelter.

It is another object of the present invention to provide a deformable loading dock seal which conforms closely to the outer periphery of the truck, resulting in minimal obstruction of the truck opening during loading or unloading.

It is an object of the present invention to provide a novel and unique loading dock shelter which effectively minimizes abrasion and wear of the seal by the truck.

Still another object of the present invention to provide a loading dock shelter rotatably supporting the seals while maintaining an effective seal with the truck.

It is an object of the present invention to provide a seal having a relatively flexible outer portion for engaging the truck and a relatively rigid inner portion for providing structural support.

It is an object of the present invention to provide a loading dock shelter having a seal whose vertical orientation may be selectively adjusted in order to accommodate the different non-horizontal grades found in many loading docks.

It is a further object of the present invention to provide a loading dock shelter which may be selectively adjusted to provide outside ventilation.

It is an object of the present invention to provide an improved seal for use in a loading dock shelter which functions in an efficient and practical manner, is easily and economically fabricated, and is adapted for operation with vehicles of various widths and heights.

In accordance with one embodiment of the invention, a loading dock shelter having a rotating seal member is provided for forming a relatively air-tight seal between the dock opening and the truck to prevent the movement of air between the inside and outside of the building during the loading and unloading operation. Seal members are rotatably mounted on each side of the dock opening so the truck may fit therebetween and a seal may be formed preferably between the exterior walls of the truck and the seal member when the truck is parked adjacent the loading dock for loading/unloading. In order to seal the gap formed between the top of the truck and the top of the dock opening, a curtain member is pivotally attached subjacent the top of the opening for engaging the top of the truck.

The seal members are rotatably mounted for rotation between a first (open) position and a second (sealing) position in response to the movement of the truck into and out of the loading dock. In the first position, the seal member is spaced outwardly from the wall and the loading dock so that it does not interfere with the normal operation of the loading dock. The seal member also projects into the path of the truck so that the rear edges of the truck engage the seal members as the truck backs into the loading dock. After the truck initially engages the seal members, the rearward movement of the truck rotates the seal members from the first position to the sealing position. In the sealing position, the seal member is compressed against the outer wall of the truck so that it does not block or otherwise interfere with the normal loading/unloading of the truck and loading dock.

The outer periphery of the seal member has a face portion adapted to sealably engage the truck walls and provide a relatively air-tight seal therebetween. In the preferred embodiment, the seal member has a circular segment cross section (when viewed in the top plan view) formed by a semi-circular face portion adapted to engage the truck wall, two side walls, and a bore for receiving a support bar which rotatably supports the seal member in a substantially vertical orientation. The face portion has a relatively semi-circular surface which projects into the path of the truck backing into the loading dock. Each end of the support bar is rotatably mounted to conventional bearings.

In order to increase the flexibility and compressibility of the outer peripheral portion of the seal member which must be capable of resiliently compressing against the truck walls, without damaging the seal member or the truck walls, the seal member has a plurality of the bores which preferably extend through substantially the entire vertical length of the outer portion. The bores permit the outer portion of the seal to be resiliently compressed by the truck without damaging the inner portion and while maintaining the rigidity of the inner portion which must be supported by the support bar.

The loading dock shelter also has means for selectively adjusting the vertical orientation of the seal members so that they may be readily and quickly adjusted in order to accommodate the angled or tilted grades present in many loading docks. In the preferred embodiment, the adjusting means comprises a bracket mounted at either end of the support bar for slidably receiving the bearing supporting the support bar. The top and bottom ends of the support bar may be independently and slidably adjusted, thereby selectively adjusting the angular orientation of the support bar from a vertical position.

In accordance with another object of the invention, the present loading dock shelter and rotating seal may be adjusted to provide outside ventilation in mild weather. The frame assembly comprises an interior frame lattice and a removable outer shell which encloses and seals the outer portion of the frame lattice during inclement weather. The frame lattice has a plurality of support members which support the seal member about the periphery of the door opening and which permit the infiltration and flow of air through the lattice between the building interior and the outside environment when the outer shell in removed. In order to prevent such air flow, the outer shell may be selectively attached to the frame lattice.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
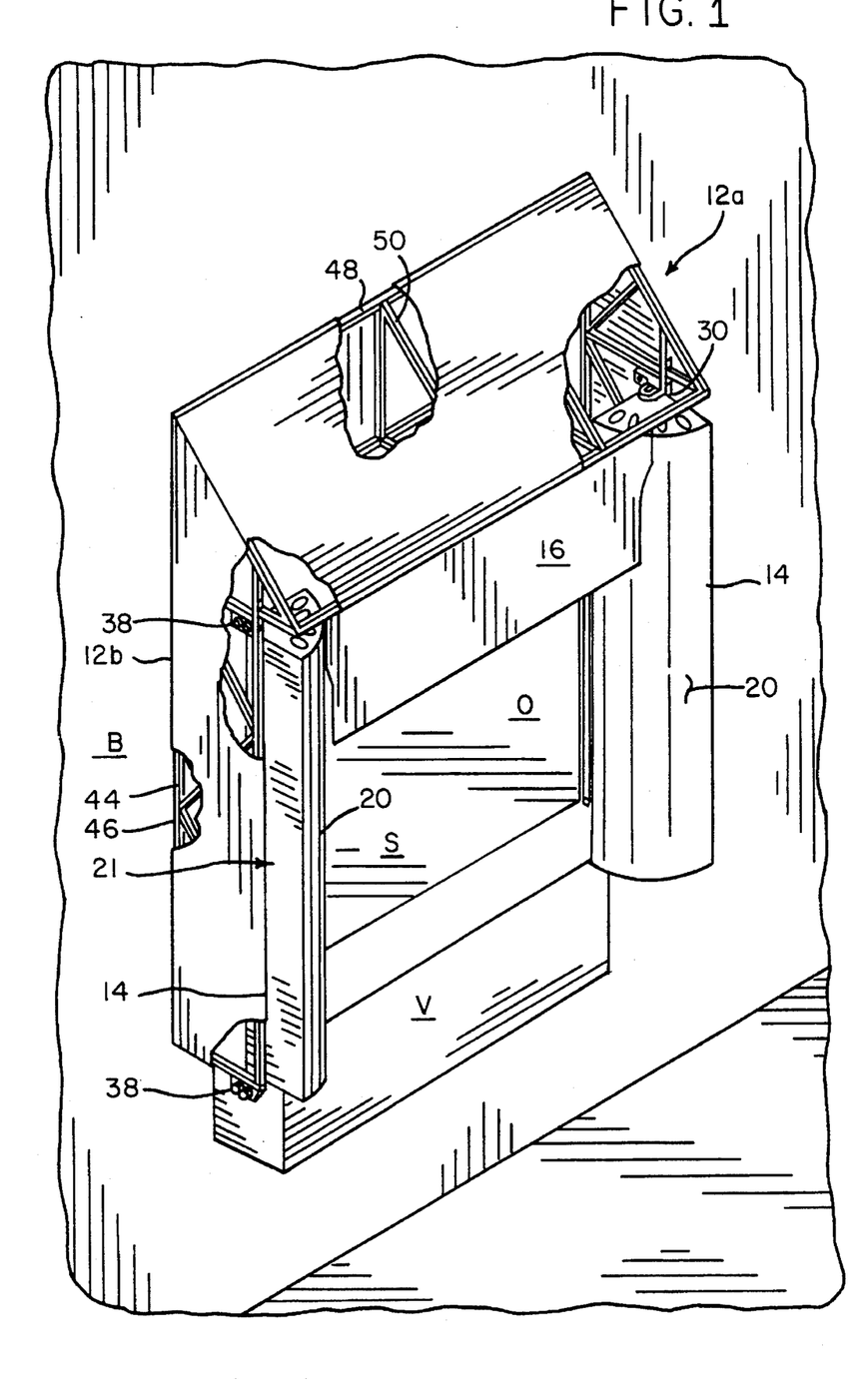
FIG. 1 is a perspective view of a loading dock shelter having rotatable seal members in accordance with the present invention having the several sections of the outer shell cut-away to illustrate the internal supporting frame lattice.

Referring to the drawings and more particularly to FIG. 1, one embodiment of a loading dock shelter 10 in accordance with the present invention is mounted adjacent a conventional loading dock D normally provided in warehouses, truck terminals, manufacturing plants and the like where raw materials and products are received and/or dispatched by trucks T.

The conventional loading dock D normally has a dock opening O in a building wall B and a horizontal surface or deck S over which loading equipment such as forklift trucks and the like and dock personnel maneuver during the loading and unloading operation. The dock D may be provided with a leveler assembly (not shown) which is adapted to compensate for height differentials between the deck S and the upper supporting surface of the truck bed. The leveler assembly is customarily disposed within a pit (not shown) subjacent the deck S of the dock D and is well known in the art. In addition, the dock D normally includes a vertical wall V or surface against which the rear end of the truck T abuts during the loading and unloading operations. The surface V may be provided with suitable bumpers or fenders (not shown) which are engaged by the rear of the truck T thereby preventing damage or defacement of either the dock D or the truck T when the truck T is backing into position. The loading dock shelter 10 is intended to effectively and readily provide a substantially air-tight seal between the dock opening O and the truck T to prevent the movement of air between the inside and outside of the building B during the loading and unloading operation.

In the embodiment illustrated in FIG. 1, the loading dock shelter 10 comprises a frame assembly 12 rigidly attached to the periphery of the dock opening O, seal members 14 rotatably mounted to the frame assembly 12 on each side of the dock opening O, and a curtain member 16 pivotally attached to the top of the frame assembly 12 to seal the gap formed between the top of the truck T and the frame assembly 12.

The frame assembly 12 comprises a header frame 12a disposed along the top of the dock opening O and two side frames 12b projecting downwardly from the ends of the header frame 12a along the lateral edges of the opening O. The frame assembly 12 may be secured to the wall B by suitable means such as bolts or the frame assembly 12 may be free-standing or self-supporting on the ground. The frame assembly 12 extends outwardly from the wall B for providing a rigid structure capable of the supporting either the seal member 14, the curtain 16, or both in a spaced relation from the wall B. Thus, unlike many conventional loading dock seals and shelters, it is not necessary that the loading dock shelter 10, the seal members 14 or the curtain 16 project into the dock D or truck openings, thereby minimizing or eliminating any interference with the loading/unloading operation.

The seal members 14 are rotatably mounted along the lateral sides of the door opening O so that the truck T may fit therebetween and a seal may be formed between the respective sides of the truck T and the seal member 14 when the truck T is parked adjacent the loading dock D for loading/unloading. Although the embodiments illustrate two seal members 14 disposed on either side of the dock opening O, it will be appreciated that in other embodiments (not shown) only one seal member 14 may be utilized or a seal member 14 may be disposed in a substantially horizontal orientation at the top of the frame assembly 12a so as to sealably engage the top of the truck T.

Figure 5:
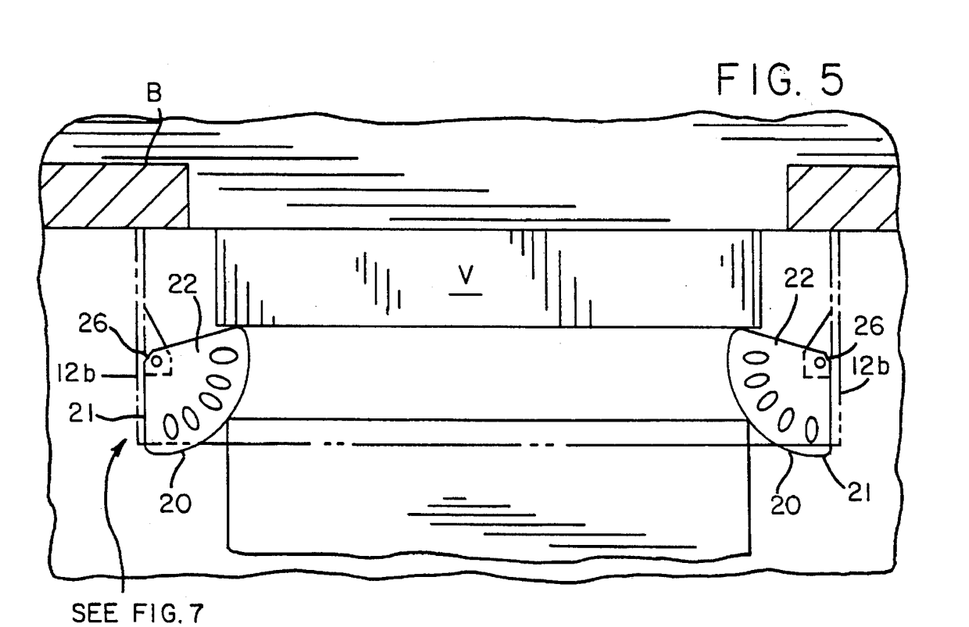
FIG. 5 is a top plan view of the loading dock illustrating the seal member in a first position receiving a truck into the loading dock.
Figure 6:
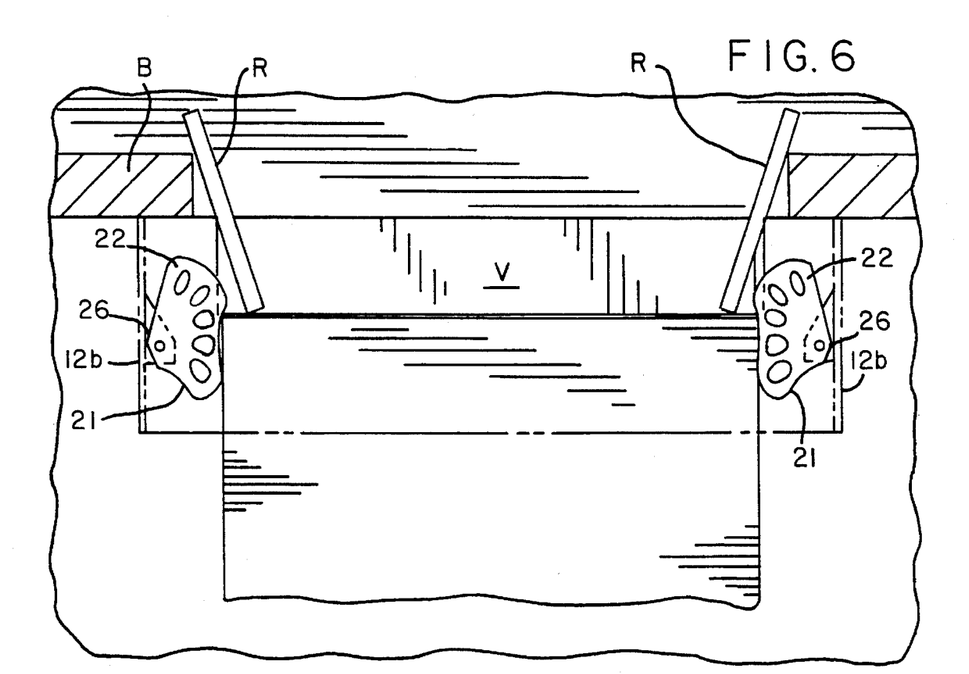
FIG. 6 is a top plan view of the loading dock and a truck parked therein illustrating the seal members in a second (sealing) position.

The seal members 14 rotate between a first, open position (as shown in FIG. 5) and a second, closed or sealing position (as shown in FIG. 6) in response to the movement of the truck T into and out of the loading dock D. In the first position shown in FIG. 5, not only are the seal members 14 spaced outwardly from the wall and the loading dock D so as not to interfere with the normal operation of the loading dock D but they also project into the path of the truck T so that the side walls and rear edge of the truck may engage the seal members 14 as the truck backs into the loading dock as shown in FIG. 5. After the truck T initially engages the seal members 14, the rearward movement T of the truck rotates the seal members 14 from the first position to the sealing position as shown in FIG. 6. In the sealing position, the seal member 14 is compressed against the outer wall of the truck T so that it does not block or otherwise interfere with the normal loading/unloading of the truck T and loading dock D unlike many conventional seals. In the illustrated embodiments, the seal members 14 engage the exterior walls of the truck T and the rear doors R of the truck T open inwardly toward the building as shown in FIG. 6 or slide up into the top of the truck T. In other trucks in which the rear doors open by rotating outwardly so that they are adjacent to the exterior walls, the seal members 14 may engage the truck doors instead of the truck walls.

Figures 7, 7A, 7B, 12:
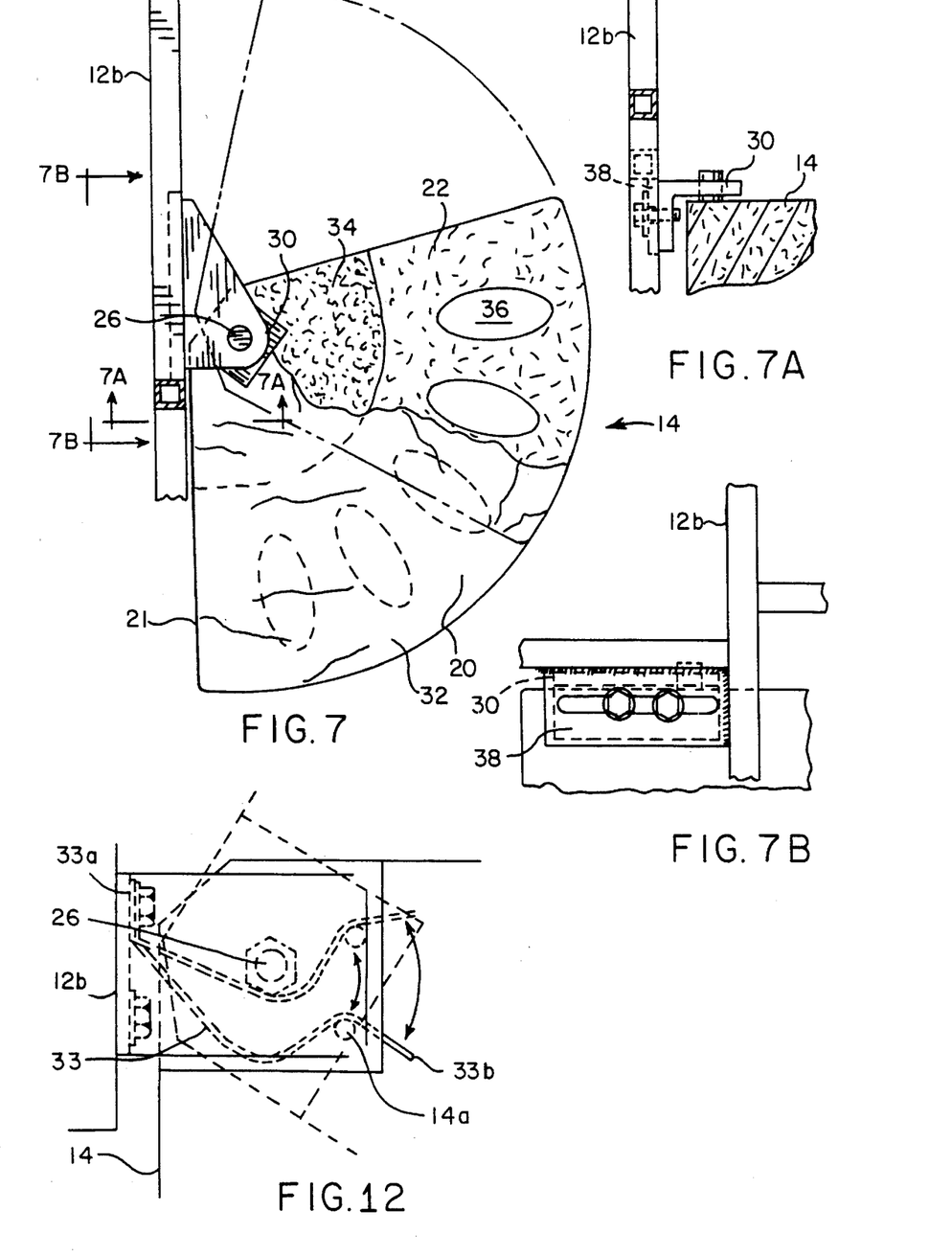
FIG. 7 is an enlarged top plan view of the seal shown in FIG. 5 having the outer shell cut-away to illustrate the internal structure of the seal member.
FIG. 7a is a cross-sectional view of the seal member taken along line 7a—7a in FIG. 7 showing the seal member pivotally mounted in a bearing housing.
FIG. 7b is a cross-sectional view of the seal member taken along line 7b—7b in FIG. 7 showing the seal member slidably mounted in a bracket.
FIG. 12 is an enlarged top plan view of the spring means for rotating the seal member from the second position to the first position.

Means is provided for rotating the seal members 14 from the sealing position to the first position after the truck T leaves the loading dock D so that the loading dock shelter 10 is ready to receive the next incoming truck T. In the embodiment illustrated in FIG. 12, the rotating means comprises a spring means 33 having one end 33a fixedly attached to the frame assembly 12b and a second end 33b. As shown in FIG. 12, the seal member 14 has a stop member 14a which rotates the second end 33b of the spring means 33 about the support bar 26. The spring means 33 is biased to rotate the seal member 14 from the sealing position to the first position after the truck T exits the loading dock D.

Although the seal member 14 may be configured in any desired shape and size, the seal member 25 preferably has a face portion 20 disposed on its outer periphery which is adapted to sealably engage the truck walls and provide a relatively air-tight seal therebetween. It is also preferable that the length of the seal member 14 be sufficient to engage and seal substantially the entire length of the truck walls. In the embodiment illustrated in FIGS. 1–7, the seal member 14 has a circular segmented section (when viewed in the top plan view) formed by a semi-circular outer face portion 20 adapted to engage the truck wall, two side walls 21, 22, and a bore 24 for receiving a support bar 26 which rotatably supports the seal member 14 in a substantially vertical orientation. The face portion 20 has a relatively semi-circular shape which projects into the path of the truck backing into the loading dock D for engaging the truck walls and for forming a substantially air-tight seal therebetween.

The support bar 26 rotatably supports the seal member 14 for movement between the first position (shown in FIG. 5) and the second sealing position (shown in FIG. 6). The support bar 26 is generally disposed in the corner 23 formed by the two side walls 21, 22 for permitting maximum rotation of the seal member 14 about the axis formed through the support bar 26. In the first position, the first side wall 21 is disposed so that it would be generally parallel to the axis of the truck T parked in the loading dock D. The angle formed between the first side wall 21 and the second side wall 22 may vary as long there is sufficient clearance for the seal member 14 to rotate to the sealing position. Although in the embodiment illustrated in FIG. 7 the rotation of the seal member 14 is limited by the frame assembly 12 and is capable of rotating less than 180 degrees, the loading dock shelter 10 and the seal member 14 may be designed so that the seal member 14 rotates 360 degrees if desired or necessary to obtain a sufficient seal.

Any suitable means may be utilized to rotatably support the support bar 26 and the seal member 14 for rotation. In the illustrated embodiment, each end of the support bar 26 is rotatably mounted in a conventional bearing generally depicted at 30. The bearing 30 is preferably attached to the frame assembly 12 although it will be appreciated that they may also be attached to the building wall B instead of the frame assembly 12 or other arm-like structure which can pivot the seal member 14 into or out of alignment with the rearward path of the truck T.

The outer portion 32 of the seal member 14 which engages the truck T must be capable of resiliently compressing against the truck T without damaging the seal member 14 or the truck walls whereas the inner portion 34 of the seal member 14 must be sufficiently rigid so that the seal member 14 will maintain its structural integrity when supported by the support bar 26. The seal member 14 is preferably made of a resilient and compressible material such as, for example, urethane foam covered by a wear-resistant material. In one embodiment, in order to increase the flexibility and compressibility of the outer portion 32 of the seal member 14 while maintaining the structural rigidity of the inner radial portion 34, the outer portion 32 of the seal member 14 may have a plurality of the bores 36 which may extend through substantially its entire length or along portions thereof as desired. The bores 36 permit the outer portion 32 of the seal member 14 to be resiliently compressed by the truck T without damaging the inner portion 34. In the illustrated embodiment, the bores 36 have an elliptical cross-section but other shapes including, for example, circular or rectangular cross sections may be used as long as they increase the flexibility and compressibility of the outer portion 32 of the seal member 14. In another embodiment, different materials may be used for the inner and outer portions 32, 34 of the seal member in order to obtain the desired rigidity for the inner radial portion 34 and flexibility for the outer portion 32.

Figure 3:
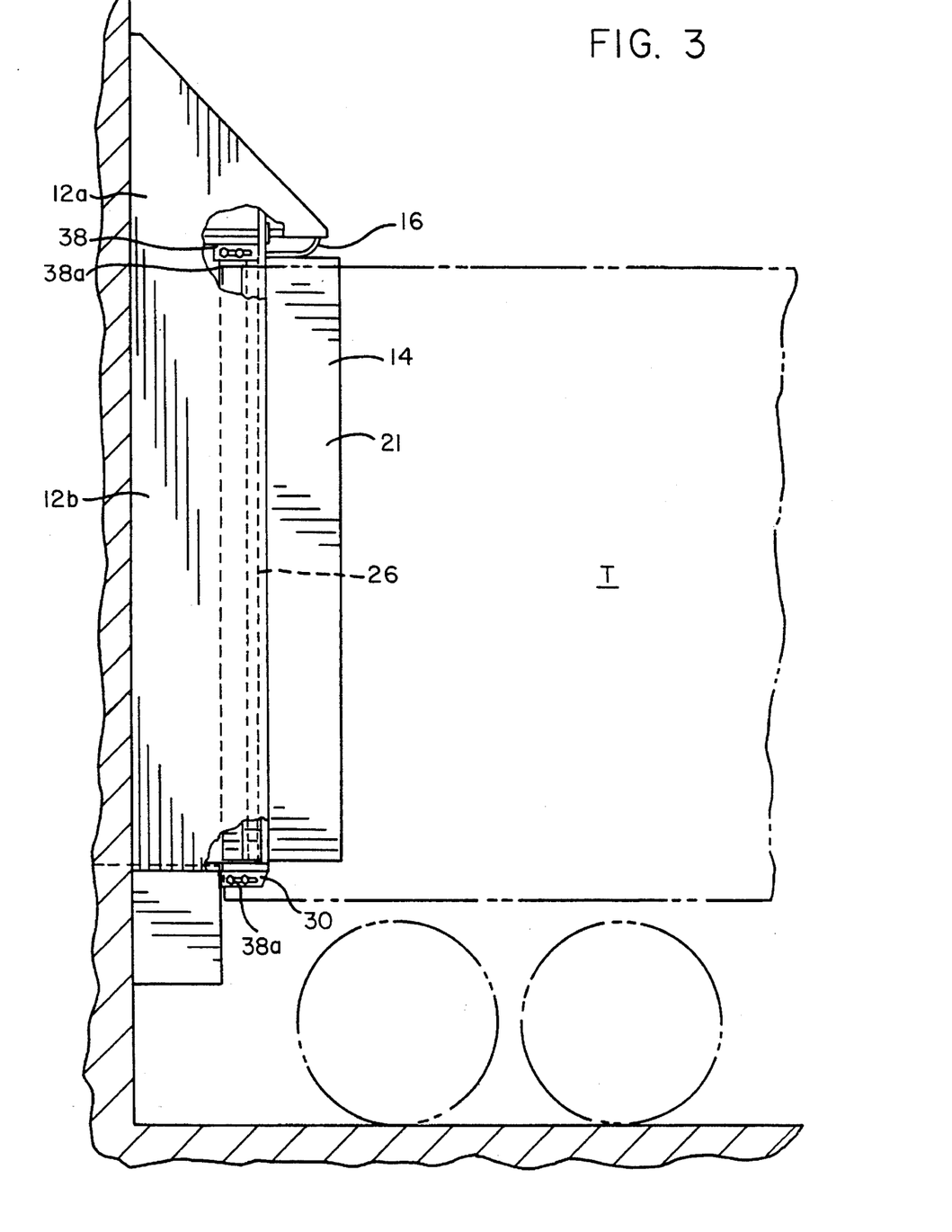
FIG. 3 is a side elevational view of the loading dock shelter and a truck parked therein.
Figure 4:
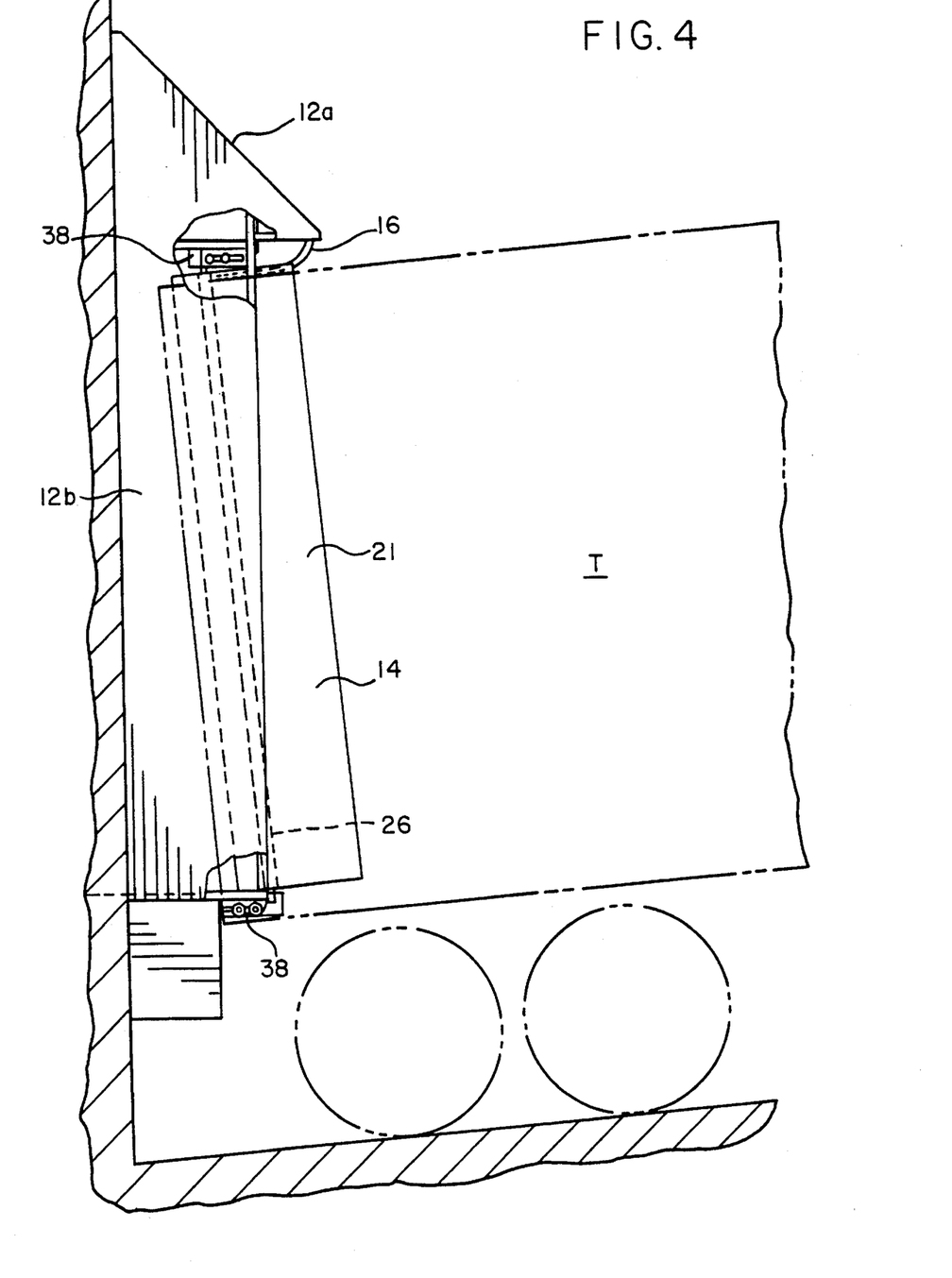
FIG. 4 is a side elevational view of the loading dock shelter and a truck parked therein on a tilted driveway.

In accordance with another object of the invention, means is provided for selectively adjusting the vertical orientation of the seal members 14 so that they may be readily and quickly adjusted in order to accommodate the angled or tilted grades present in many loading docks D unlike conventional loading dock shelters which must be individually designed and sized to accommodate the angled grades or driveways. In the embodiment illustrated in FIGS. 1–7, the adjusting means comprises a bracket 38 mounted at either end of the support bar 26. Each bracket 38 has a slot 38a for slidably receiving the bearing 30 supporting the support bar 26. The top and bottom ends of the support bar 26 may be independently adjusted, thereby selectively adjusting the orientation of the support bar 26 from a vertical position. In FIG. 3, the support bar 26 and the axis formed through the support bar 26 is shown in a substantially vertical orientation to accommodate a level grade. In FIG. 4, the support bar 26 and the axis has been rotated in a counterclockwise direction from the vertical position to accommodate an upward grade. The support bar 26 and axis may be similarly adjusted to accommodate downward grades. Means other than the bracket 38 may be utilized to permit the seal member 14 to be adjusted in the vertical orientation.

Figure 2:
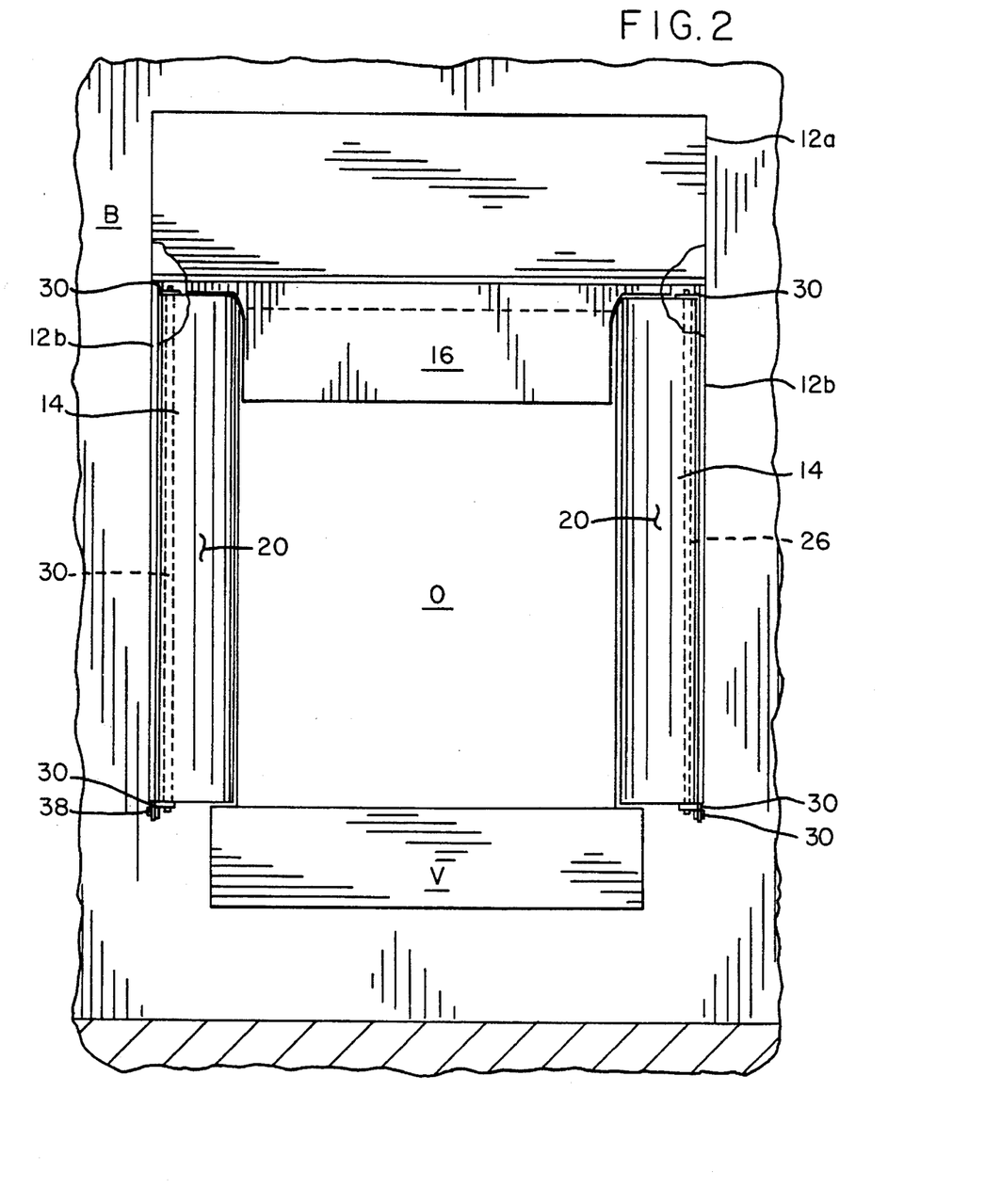
FIG. 2 is a front elevational view of the loading dock shelter.

In order to seal the gap formed between the top of the truck T and the frame assembly 12, a generally T-shaped header curtain 16 is suspended from the frame assembly 12 as shown in FIG. 2. The curtain 16 is made of a relatively flexible material such as an industrial coated fabric, a vinyl-coated nylon, or a foam filled cover which engages and seals the gaps between the frame assembly 12, the rotating seal members 14, and the top of the truck T. The upper portion 16a of the curtain 16 is disposed along the length of the header frame 12a in order to seal any gaps between the rotating seal members 14 and the header frame 12a. The lower portion 16b of the curtain 16 projects downwardly from the upper portion 16a and is adapted to seal the gaps between the rotating seal members 14 and the top of the truck T. In order to seal any gaps that may form between the seal member 14, the curtain 16, and the frame assembly 12, any suitable weather'seal may be used.

In order to operate the loading dock shelter 10 having rotating seal members 14, the truck T backs into the loading dock D in a conventional manner. The seal member 14 is initially in the first position as illustrated in FIG. 5 so that it projects into the rearward path of the truck T. The rear edges of the truck initially engage the face portion 20 disposed at the outer periphery of the seal member 14 and compress the outer portion 32 of the seal member 14. The rearward movement of the truck T rotates the seal member 14 from the first position to the second sealing position illustrated in FIG. 6 so that a substantially air-tight seal is created between the seal member 14 and the truck walls. Since the seal member 14 rotates in response to the rearward movement of the truck, abrasion and wear caused by the truck T rubbing against the seal member 14 is minimized or eliminated. Since the seal member 14 engages the exterior walls of the truck T, the seal member 14 does not project into the door opening O or the truck opening and does not interfere with the loading/unloading operation. When the loading operation is completed, the truck T drives out of the loading dock D and the spring means 33 rotates the seal member 14 from the second position (FIG. 6) to the first position (FIG. 5) for the next truck T.

Figure 8:
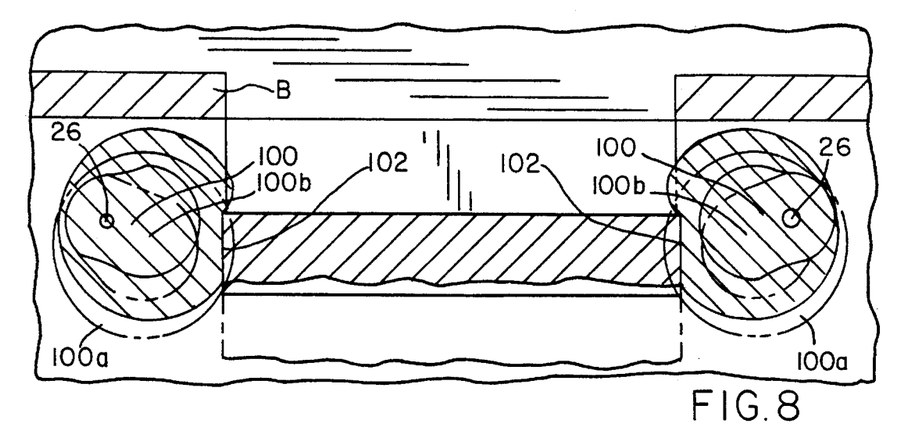
FIGS. 8–10 are alternative embodiments of the seal member.
Figure 9:
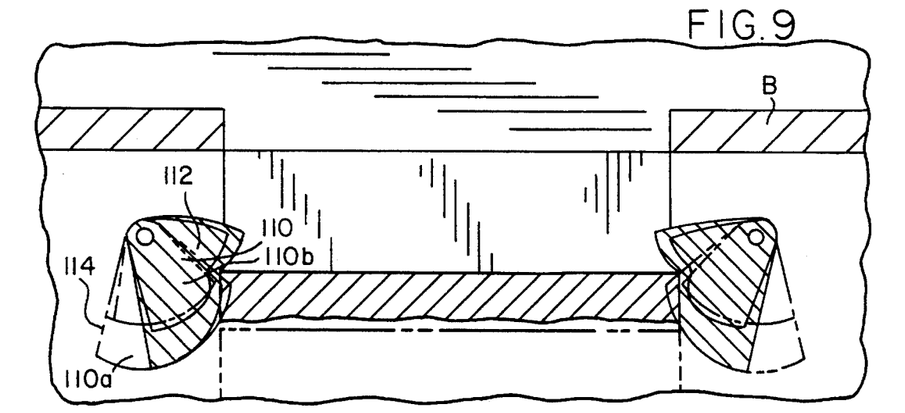
Figure 10:
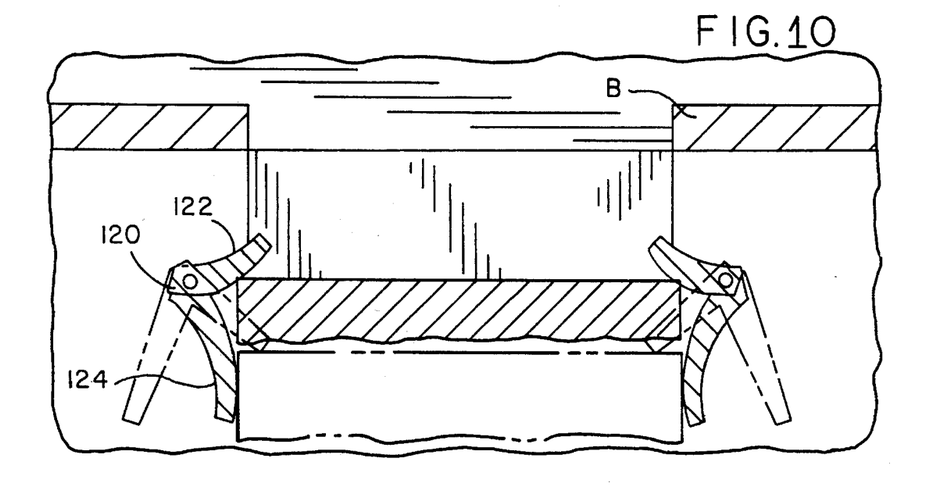

FIGS. 8–10 illustrate other embodiments of the seal member in accordance with the present invention. FIG. 8 illustrates a seal member 100 having a circular cross-section (when viewed in top plan view) which is eccentrically mounted on the support bar 26. The broken lines illustrate the first position of the seal member 100. It will be seen that the seal member 100 projects into the path of the truck T. The solid cross-hatched lines illustrate the seal member 100 in the sealing position wherein the face portion 102 of the seal member 100 is resiliently compressed against the truck walls. Mounting the support bar 26 off-center positions the seal member 100 further into the path of the truck T and creates a greater compression force and tighter seal between the seal member 14 and the truck wall. It is preferable that the outer portion 100a of the seal member 100 be more flexible and compressible than the relatively rigid inner portion 100b in order to obtain the sufficient sealing engagement with the truck walls. The outer peripheral portion 100a of the seal member 100 may also have the bores (not shown) therethrough to provide the requisite flexibility and compressibility.

FIG. 9 illustrates a seal member 110 having a generally elliptical cross-section (when viewed in the top plan view). The broken lines illustrate the first position of the seal member 110 and the solid cross hatched illustrate the sealing position. In the illustrated embodiment, the seal member 110 has a smaller radius in the rear portion 112 and a larger radius in the front portion 114. The rear portion 112 of the elliptical seal member 110 projects into the path of the truck T in the first position so that the incoming truck engages the rear portion 112 and rotates the seal member 110 into the second (sealing) position. Since the front portion 114 has a larger radius than the rear portion 112, a larger compression or sealing force is created on the truck wall. Typically, the smaller rear portion 112 will not project into the dock D and truck openings as much as the front portion 114, thereby minimizing any interference with the loading/unloading operation. It is preferable that the outer portion 110a of the seal member 110 which engages the truck be more flexible and compressible than the relatively rigid inner portion 110b in order to obtain the sufficient sealing engagement with the truck walls.

FIG. 10 illustrates another embodiment of the seal member 120 having first and second arms 122, 124 forming a generally V-shaped cross-section. The broken lines illustrate the seal member 120 in the first position and the solid cross hatched lines illustrate the seal member 120 in the sealing position. The first arm 122, which is shorter than the second arm 124 in the illustrated embodiment, projects into the path of the incoming truck T. After the truck T engages the first arm 122, the seal member 120 is rotated so that a relatively air-tight seal is formed between the seal member 120 and the truck walls.

Figure 11:
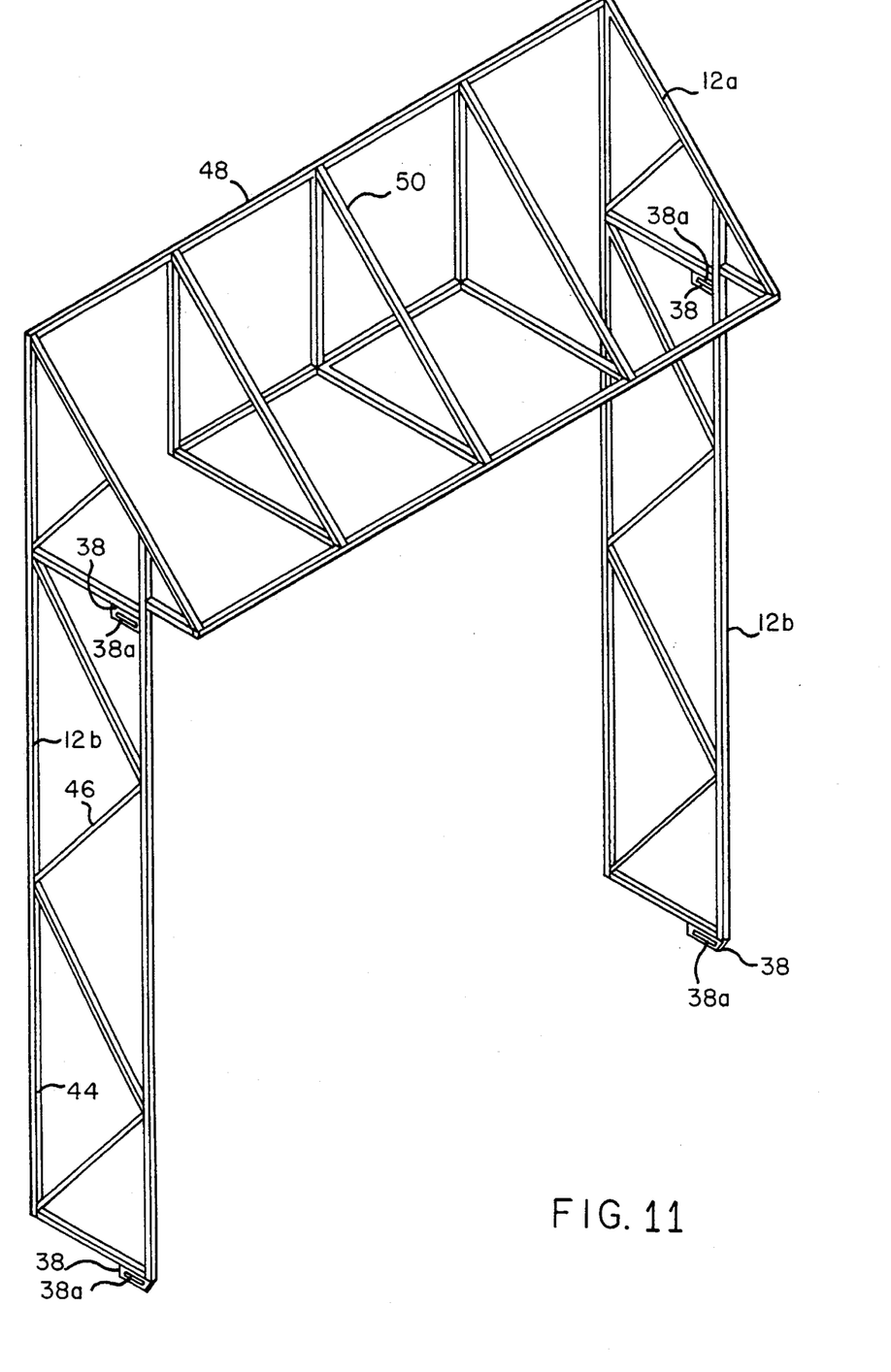
FIG. 11 is a perspective view of one embodiment of the interior frame.

In accordance with another object of the invention, the present loading dock shelter 10 and rotating seal 14 may be adjusted to provide outside ventilation in mild weather unlike many conventional dock seals which form a seal with the truck which cannot be readily adjusted. The frame assembly 12 comprises an interior frame lattice 40 and a removable outer shell 42 for enclosing and sealing the outer portion of the frame lattice 40 during inclement weather. The frame lattice 40 may have any structure which is capable of rotatably supporting the seal member 14 about the periphery of the door opening O and which will permit movement of air between the building interior and the outside environment. In the embodiment best illustrated in FIGS. 1 and 11, the side frames 12b comprise a plurality of vertical support members 44 and lateral reinforcing members 46 and the header frame 12a comprises a plurality of horizontal support members 48 and lateral reinforcing members 50. It will be appreciated that the interior frame lattice 40 will permit the movement of air between the inside and outside of the building. In order to prevent such air flow, the outer shell 42, may be attached to the frame lattice 40 using snap-buttons, zippers or any other conventional means so that the shell 42 may be selectively removed during mild weather. The outer shell may be made of any material adapted to enclose the interior frame lattice, including, for example, insulating materials, vinyl fabrics, fiber glass, plastic, or sheet metal. A screen-like outer shell may also be utilized if desired. The combination of the header frame 12a and outer shell 42 form an integral hood section 52 to shield the dock opening O from rain, snow and other inclement weather, unlike many typical loading dock shelters which utilize a separate header frame and hood.

We claim as our invention:

1. A loading dock shelter mounted adjacent a dock opening in a building wall for use with a truck parked on a driveway adjacent the dock opening, the loading dock shelter comprising:

at least one unitary seal member rotatably mounted at the periphery of the dock opening for movement about an axis between first and second positions in response to movement of the truck wherein the seal member projects into the path of the incoming truck in the first position and the seal member is adapted to engage a panel of the truck for forming a substantially air-tight seal between the truck and the opening in the second position, the seal member having an outer portion for resiliently and compressibly engaging the panel of the truck for forming the air-tight seal and a rigid inner portion made from a material that is more rigid than the outer portion.

2. The loading dock shelter as set forth in claim 1 wherein the rigid inner portion is capable of supporting the seal member for rotatable movement about the axis and the flexible outer portion permits the seal member to be resiliently compressed against the truck.

3. The loading dock shelter as set forth in claim 2 wherein the flexible outer portion has a plurality of bores for permitting the seal member to be resiliently compressed against the truck.

4. The loading dock shelter as set forth in claim 3 wherein the bore has an elliptical cross section.

5. The loading dock shelter as set forth in claim 2 wherein at least two of said seal members are disposed on the lateral sides of the opening and spaced apart for engaging the sides of the truck therebetween.

6. The loading dock shelter as set forth in claim 2 comprising an adjustment assembly mounted on the periphery of the dock opening for adjusting the orientation of the seal member relative to the driveway.

7. The loading dock shelter as set forth in claim 6, wherein the adjustment assembly receives each end of the seal member so that each end can be selectively adjusted to vary the orientation of the seal member relative to the driveway.

8. The loading dock shelter as set forth in claim 6 wherein the adjustment assembly slidably receives each end of the seal member so that each end can be selectively adjusted to vary the orientation of the seal member relative to the driveway.

9. The loading dock shelter as set forth in claim 2 comprising a frame assembly attached to the wall about the periphery of the dock opening for rotatably supporting the seal member for movement between the first and second positions.

10. A loading dock shelter mounted adjacent a dock opening in a building wall for use with a truck parked on a driveway adjacent the dock opening, the loading dock shelter comprising:

a frame assembly having an interior frame lattice disposed about the periphery of the dock opening for supporting at least one seal member adapted to engage the truck, the interior frame lattice formed by a plurality of support members which are spaced apart to permit the movement of air therethrough, and an easily removable outer shell detachably mounted to the support members for selectively covering the frame lattice to prevent the movement of air through the frame lattice and for permitting selective removal independently of the seal member for permitting the movement of air through the frame lattice the frame assembly having at least one unitary seal member rotatably mounted thereto for movement about an axis between first and second positions in response to movement of the truck wherein the seal member projects into the path of the incoming truck in the first position and the seal member is adapted to engage a panel of the truck for forming a substantially air-tight seal between the truck and the opening in the second position, the seal member having a flexible outer portion for resiliently and compressibly engaging the panel of the truck for forming the air-tight seal and a rigid inner portion capable of supporting the seal member for movement about the axis.

11. The loading dock shelter as set forth in claim 10 wherein the frame assembly comprises a header frame disposed at the top of the dock opening and a side frame depending from either end of the header frame at the lateral sides of the dock opening.

12. The loading dock shelter as set forth in claim 10 wherein the inner portion is made from a material that is more rigid than the outer portion.

13. The loading dock shelter as set forth in claim 10 wherein the flexible outer portion has a plurality of bores for permitting the seal member to be resiliently compressed against the truck.

14. The loading dock shelter as set forth in claim 13 wherein the bore has an elliptical cross section.

15. The loading dock shelter as set forth in claim 10 wherein at least two of said seal members are disposed on the lateral sides of the opening and spaced apart to engage the sides of the truck therebetween.

16. The loading dock shelter as set forth in claim 10 comprising adjustment assembly mounted on the periphery of the dock opening for adjusting the orientation of the seal member relative to the driveway.

17. The loading dock shelter as set forth in claim 16 wherein the adjustment assembly receives each end of the seal member so that each end can be selectively adjusted to vary the vertical orientation of the seal member relative to the driveway.

18. The loading dock shelter as set forth in claim 16 wherein the adjustment assembly slidably receives each end of the seal member so that each end can be selectively adjusted to vary the orientation of the seal member relative to the driveway.

* * * * *